April 19, 1938.  J. E. McBURNEY  2,114,744
GLASS MELTING FURNACE
Filed April 3, 1936  5 Sheets-Sheet 1

James E. McBurney
INVENTOR.
BY Rule & Hoge
ATTORNEYS

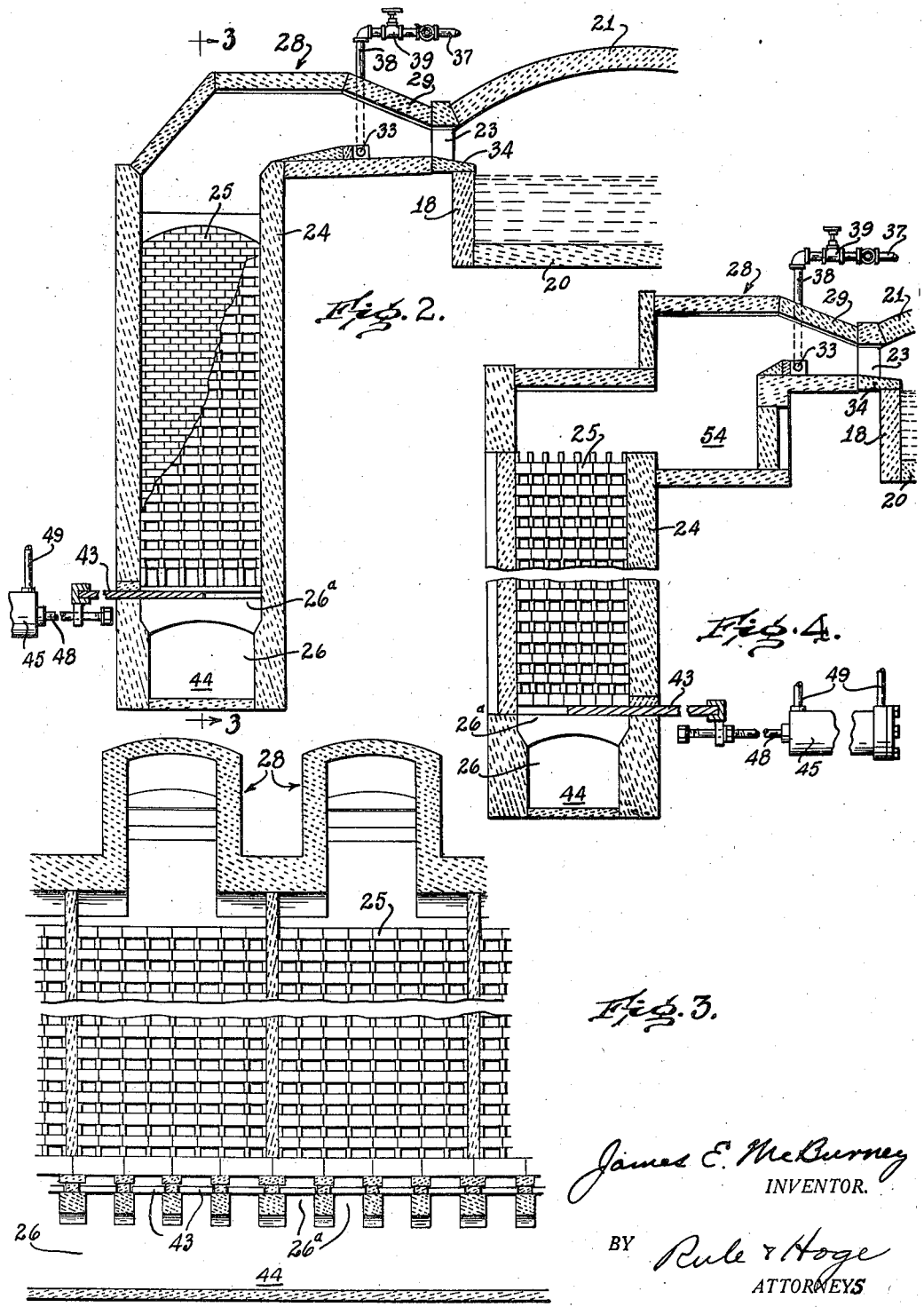

April 19, 1938.  J. E. McBURNEY  2,114,744
GLASS MELTING FURNACE
Filed April 3, 1936   5 Sheets-Sheet 3

INVENTOR.
James E. McBurney
BY
Rule & Hoge
ATTORNEYS.

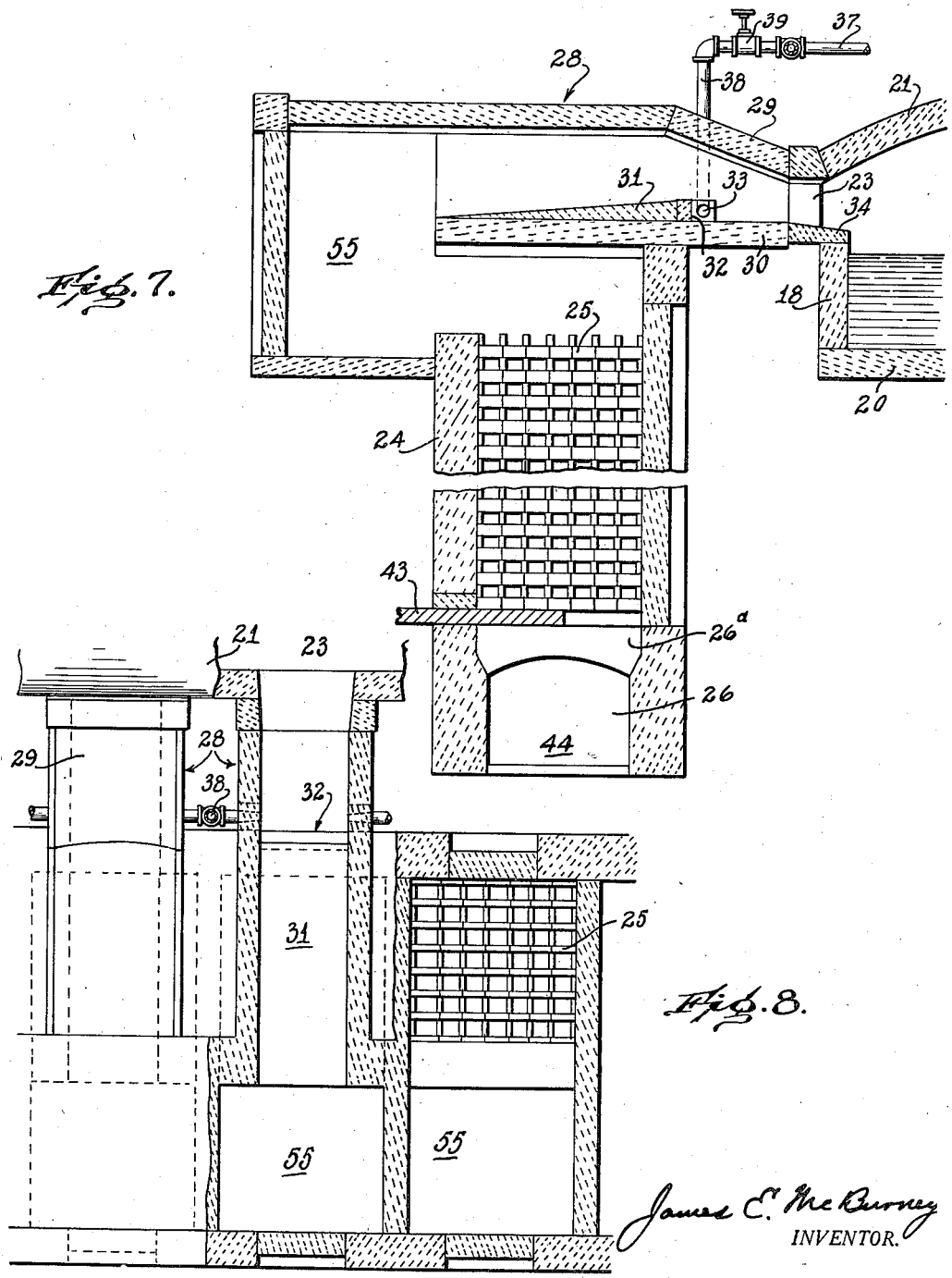

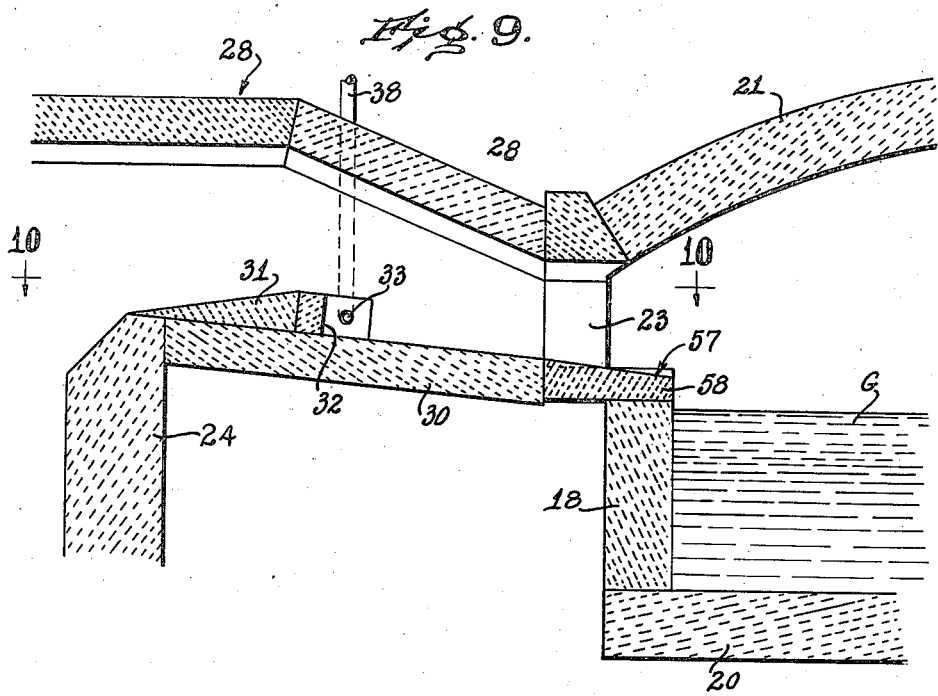
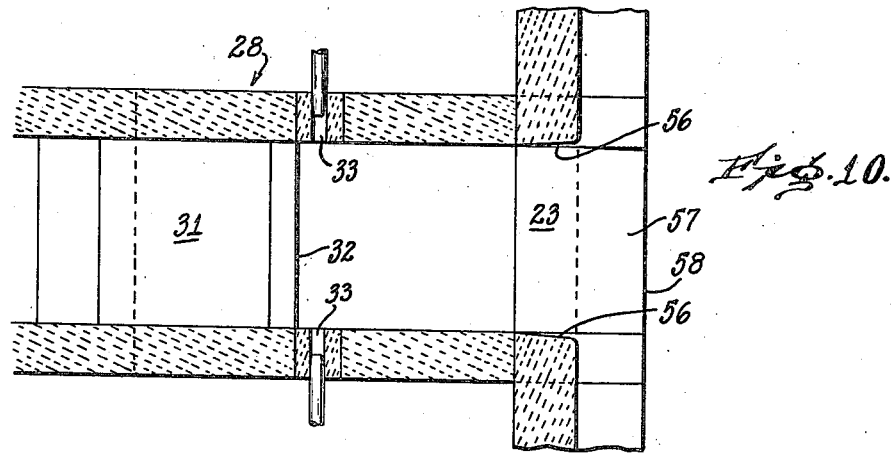

Patented Apr. 19, 1938

2,114,744

UNITED STATES PATENT OFFICE 2,114,744

GLASS MELTING FURNACE

James E. McBurney, Alton, Ill., assignor to Owens-Illinois Glass Company, a corporation of Ohio Application April 3, 1936, Serial No. 72,500

3 Claims. (Cl. 263—15)

The present invention relates to improvements in glass melting furnaces and particularly to the continuous type wherein the raw batch is continuously delivered to the charging end of the furnace and during passage to the delivery end, is melted and refined.

In furnaces of this type, the fuel mixture is introduced by way of ports arranged in a longitudinal series along each of the opposed longitudinal side walls, said ports leading to sources of supply of fuel and preheated air, the latter being preheated by means of checkerwork which in the first instance obtains its heat from waste gases of combustion passing over the checkerwork to the stack. The two series of ports are operated independently of each other in such fashion that the fuel mixture is introduced into the furnace through the two series of ports in alternation.

It is commonly known that as a furnace increases in age, all of the checkerwork becomes clogged with batch dust etc. to some degree and the checkerwork nearest the charging end or point at which the raw batch is introduced into the furnace, becomes more clogged than that at and in proximity to the opposite end. This clogging is also due in part to the erosion and subsequent dripping of the bricks forming the neck of the port immediately over the checkerwork. As a result of the clogging and consequent restriction of the free passage of air through the checkerwork, there is a very appreciable decrease in the efficiency of combustion. The melting capacity of the tank is thereby greatly reduced for the reason that the amount of fuel that can be burned is necessarily limited.

Another objection to ordinary furnace operation is that the air and gas are too completely mixed prior to the introduction into the combustion chamber. This results in too rapid combustion of the fuel and therefore lower melting efficiency.

An object of the present invention is to overcome the above objections and others and provide a structure which will result in the maintenance of a long highly luminous flame lying close to the surface of the glass and extending well across the furnace. By this method of combustion control, the lower half of the combustion chamber is filled with the long luminous flame or blanket of intense heat while the upper half is comparatively free of combustibles and in fact contains to a very large degree of excess air which in effect forms a blanket holding the flame in intimate contact with the surface of the glass and unmelted batch.

Another object of the present invention is the provision of a construction through the employment of which, the fuel, such for example as gas, may be introduced at opposite sides of a passageway between the corresponding port and checkerwork at low pressure and in such fashion that there is no "humping" of the gas into the air stream, the latter being more or less restricted to the upper areas of the passageway and port.

A further object of the invention is the provision of novel means for controlling the direction and speed of the flame during its travel substantially across the furnace. To this end the port is so designed that it increases in width towards the furnace and thereby gives greater breadth or horizontal spread to the flame.

It is also an object to provide in addition to the blanket of excess air, means for effecting exceptionally intimate contact between the flame and surface of the glass. To this end the upper and lower walls of the port are so shaped that the inflowing fuel mixture is deflected downwardly onto the glass surface as it passes through the port.

In order to compensate for greater clogging of the checkerwork at the charging end of the furnace than at the delivery end thereof, dampers individual to the ports and corresponding checkerwork are provided, with the result that the effective area of the checkerwork may be regulably controlled with a view toward balancing or in any preferred fashion, proportioning the volume of air passing through the checkerwork to the ports.

A still further object is the provision of novel means for avoiding excessively complete mixture of the air and gas in advance of introduction into the furnace. To this end there is provided a baffle for each port arranged to shield the inflowing fuel gas from the air in such fashion as to delay mixture of the air and gas substantially until these two elements are about to pass through the port into the furnace.

Other objects will be in part apparent and in part pointed out hereinafter.

In the drawings:

Fig. 2 is a fragmentary sectional view taken along the line 2—2 of Fig. 1 and showing the preferred construction.

Fig. 3 is a sectional view taken along the line 3—3 of Fig. 2.

Fig. 4 is a fragmentary vertical sectional view similar to Fig. 2 but showing a slightly different relative positioning of the checkerwork and slag pocket etc.

Fig. 7 is a fragmentary vertical sectional view similar to Fig. 2 showing a somewhat different relative positioning of the checkerwork slag pocket and port.

Fig. 8 is a sectional plan view taken at different levels on three adjacent ports and regenerators.

Fig. 9 is a detail sectional view of another form of passageway connecting the checkerwork and port.

Fig. 10 is a sectional view taken substantially along the line 10—10 of Fig. 9.

Figure 1:
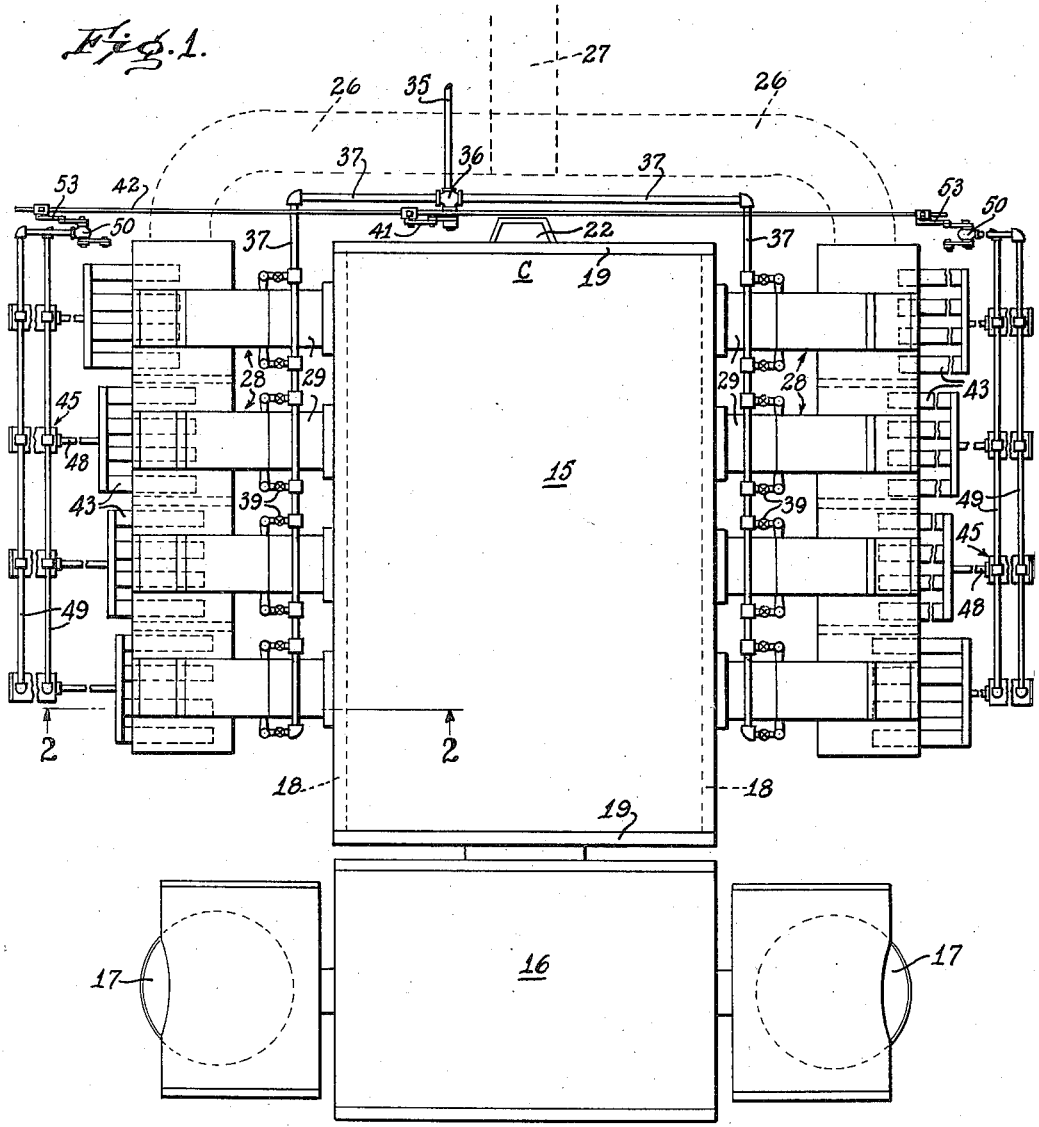
Fig. 1 is a plan view of a glass melting furnace constructed in accordance with the present invention.
Figure 5:
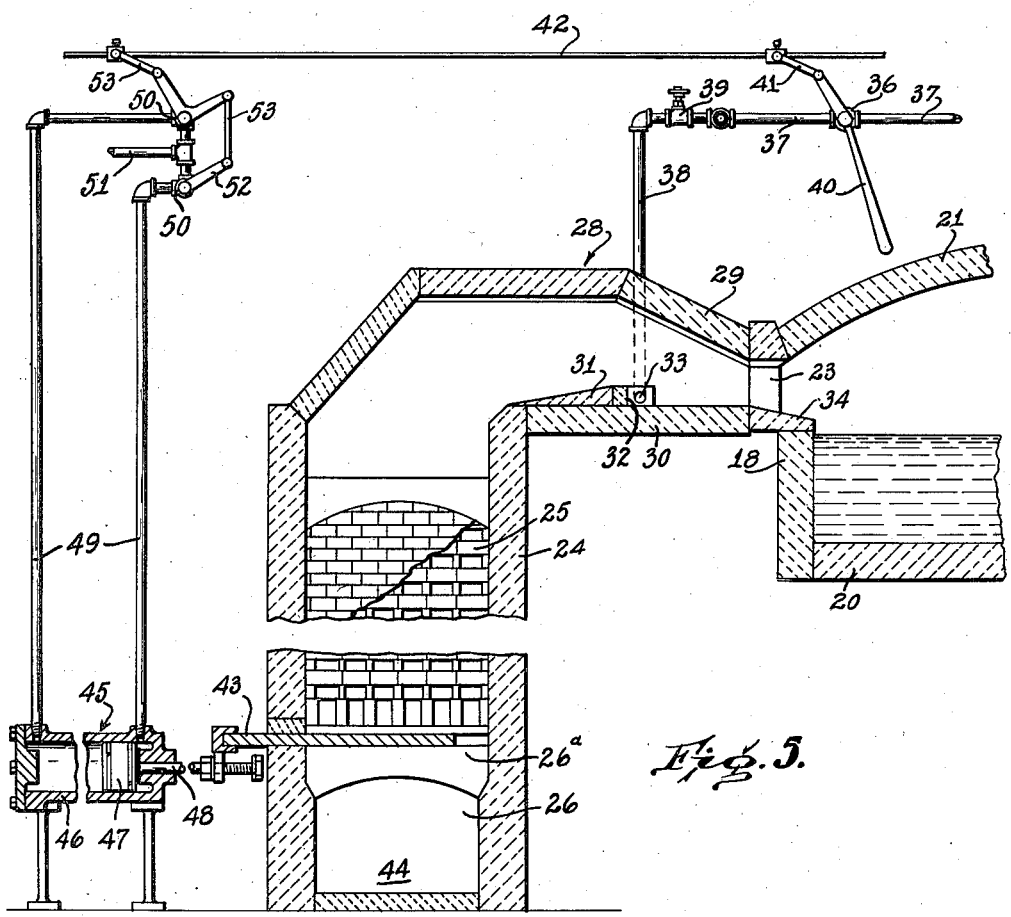
Fig. 5 is a view similar to Fig. 2 illustrating the damper and gas control means.
Figure 6:
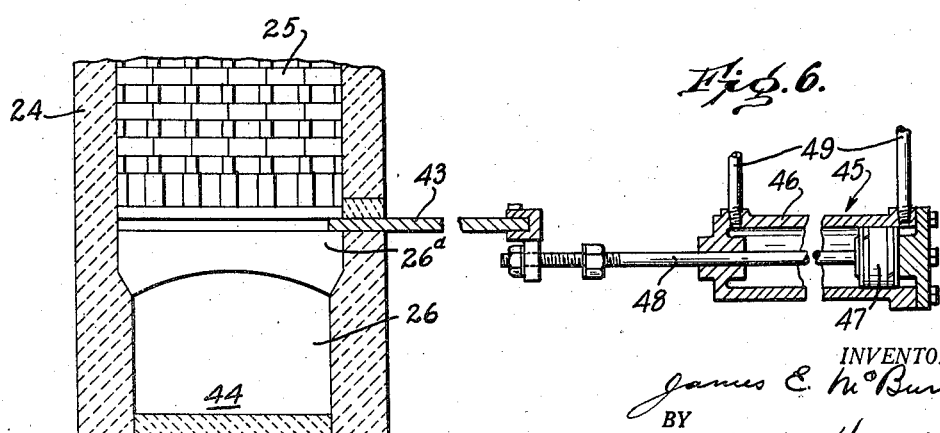
Fig. 6 is a fragmentary detail sectional view of one of the dampers and its operating means.

That type of furnace with which the present invention is particularly adapted for use, is illustrated in Fig. 1 and consists of a melting compartment 15 and refining compartment 16 connected together in any conventional manner and operating to condition glass for delivery to revolving pots 17 from which mold charges of molten glass are obtained by forming machines (not shown). The melting compartment 15 or chamber, includes longitudinal side walls 18, Figs. 1 and 5, and end walls 19, together with a floor 20 and cover 21 or roof. At the charging end C there is provided an opening 22, commonly known as a "doghouse" through which the "batch" or raw materials may be fed to the furnace. Owing to the continuous removal of glass from the revolving pots 17, the glass in the melting chamber 15 is caused to move substantially in the direction of the length of said chamber towards the refining chamber 16. Thus, the raw materials are subjected to the influence of heat introduced through series of ports 23 provided in the opposed longitudinal side walls 18 of the melting chamber 15.

These ports 23, as in the conventional type of furnace, communicate with regenerators 24 individual thereto, which regenerators include vertical passageways enclosing the usual checkerwork 25 or bricks. The group of regenerators at each side of the furnace are connected at their lower ends to a common passageway 26 or flue, which extends alongside of the furnace, the two flues being connected together in proximity to the charging end of the furnace and to a common conduit 27 leading to a stack (not shown). The operation of the furnace in principle is similar to that involved in the conventional furnace to the extent that firing takes place through one series or group of ports at a time, the other ports and regenerators associated therewith functioning as exhaust means through which the waste gases of combustion are directed to the stack. It is of course understood that the waste gases heat up the checkerwork so that when the firing order is reversed, air which is mixed with the fuel gas substantially at the point of passage through the ports, may be preheated by impingement upon the checkerwork prior to such mixing with the fuel gas.

Each of the ports is connected to one of the regenerators 24 by way of a horizontal flue 28, the cross sectional area of which decreases towards the port as a result of inclining the cover 29 or roof in proximity to the port. The bottom wall 30 is disposed substantially horizontally and supports a baffle 31, which extends the full width of the flue. This baffle is tapered upwardly towards the port 23 and at its inner end terminates in a transverse vertical wall 32 in proximity to which the fuel gas is introduced into said flue. The inlet ports 33 for the fuel gas, are arranged in pairs and are disposed below the upper surface of the baffle 31 and close to the wall 32 so that the gas will not be introduced directly into the air stream immediately upon leaving the ports 33. Instead, the fuel gases will move lengthwise of the flue with a sort of rolling motion over the floor 30 of the flue and to a greater or lesser degree, will remain segregated from the inflowing air during and for a considerable period following passage through the furnace port 23. Obviously, the fuel gas and air will intermix to some extent but by no means to the usual degree. As a result, a highly luminous flame will impinge upon the surface of the unmelted batch and molten glass. The effectiveness of the flame will be materially increased by reason of the blanket of air overlying the burning products of combustion. By means of the downwardly tapered top surface 34 of the lower wall of the port 23, the products of combustion introduced into the furnace will be directed to the surface of the molten glass and unmelted batch in close proximity to the side wall 18 of the furnace and will thereby greatly facilitate uniform melting of the materials.

Fuel gas is delivered to the flues 28 from a main supply pipe 35 (Fig. 1) which is connected by means of a three-way valve 36 to branch or manifold pipes 37. These branch pipes 37 extend lengthwise of the furnace, and by means of pipes 38 and manually controlled valves 39, are connected to the opposed ports 33 provided in the flues 28. The three-way valve 36 is manually controlled by a lever 40, which is connected through a link 41 to a rod 42, the latter being movable with and directly as a result of operation of the valve 36 for the purpose of adjusting the positions of dampers 43 or slide valves by means of which the flow of air through the regenerators 24 may be regulably controlled. These dampers are arranged in the openings 26ª or ports between the checkerwork 25 and slag pockets 44 which are individual to the regenerators and form a part of the flue 26. The dampers extend through the outer walls of the regenerators and are suitably connected to piston type air motors 45. Each of these motors includes a horizontal cylinder 46 and a piston 47 therein, the latter being adjustably connected through a rod 48 to the corresponding slide valve 43 or damper. Air supply pipes 49 are connected to the opposite ends of each piston motor 45 and by way of valves 50 individual thereto, are connected to an air supply pipe 51. Levers 52 and links 53 operatively connect the valves 50 to the push rod 42 so that the slide valves 43, or dampers, are adjusted simultaneously with actuation of the fuel gas control valve 36.

In order to compensate for the progressively increased degree of clogging of the checkerwork from the charging end C to the delivery end, whereby a substantially balanced heating condition may be maintained lengthwise of the melting chamber 15 under almost any circumstances, the slide valves 43, or dampers, are individually adjustable by means of the connection between the piston rods 48 and said dampers. Thus, adjustment may be made whereby the volume of air passing through the regenerators nearest the charging end, may be increased in proportion to and to offset the effect of the clogging of the checkerwork. As stated heretofore, the checkerwork nearest the charging end becomes clogged more rapidly and completely than in the other regenerators, because the batch dust is present in greater quantities in this particular zone than in any other portion of the furnace.

In Fig. 4 the construction differs from that described above, to the extent that the slag pocket 54 is interposed between the flue 28 and the regenerator 24.

In Fig. 7 I have shown another type of regenerator in which the checkerwork 25 is diposed directly beneath a major portion of the flue 28, and the passageway 55 connecting the regenerator and flue is offset relative to the path of movement of air through the checkerwork.

In Figs. 9 and 10, the flue 28 is shown declined towards the port 23 and the opposed vertical side walls 56 of the port are tapered in order to effect a lateral spreading or fanning out of the products of combustion immediately upon entering the furnace chamber. The upper surface 57 of the bottom wall 58 is tapered downwardly in order to effect more intimate contact between the products of combustion and the surface of the glass G, as brought out heretofore in connection with the surface 34 of the block shown in Fig. 2. Such tapering of these surfaces greatly increases the effectiveness of the products of combustion.

Modifications may be resorted to within the spirit and scope of the appended claims.

I claim:

1. In a glass melting furnace, a side wall having a horizontal port therein, a regenerator, a flue connecting one end of the regenerator and said port, checkerwork in the regenerator upon which air impinges during movement through the regenerator to said flue and port, fuel pipes opening into the lower portion of the flue medially and at opposite sides thereof, an upwardly inclined baffle extending across the flue in advance of the fuel pipes commencing at the forward edge thereof and terminating adjacent the region of entrance of said fuel pipes whereby to deflect air flowing through the flue to the upper regions thereof and in a measure segregate the fuel gas and air during movement through the flue.

2. In a glass melting furnace, a side wall having a horizontal port therein, a regenerator, a flue connecting one end of the regenerator and said port, checkerwork in the regenerator upon which air impinges during movement through the regenerator to said flue and port, fuel pipes opening into the lower regions of the flue medially and at opposite sides thereof, an upwardly inclined baffle extending across the flue in advance of the fuel pipes commencing at the forward edge thereof and terminating adjacent the region of entry of the fuel pipes and above the same whereby to deflect air flowing through the flue to the upper regions thereof and in a measure segregate the fuel gas and air during movement through the flue.

3. In a glass melting furnace, an elongated melting tank provided with opposed longitudinally extending series of transversely and horizontally extending ports in the side walls thereof, a series of regenerators individual to each series of ports, flues individual to the regenerators and connecting the same to corresponding ports, checkerwork in the regenerators, a fuel supply pipe, a manifold pipe for each series of flues for supplying fuel thereto, a three-way valve connecting said fuel supply pipe and manifold pipes, adjusting valves in said manifold pipes individual to each flue, an air supply conduit, a manifold conduit for each series of regenerators for supplying air thereto, a series of individually adjustable dampers in each manifold conduit individual to each series of regenerators, valve controlled means for opening and closing the dampers of each series in unison, a valve for each of said valve controlled means, and means connecting said valves including said three-way valve whereby actuation of the latter operates to close one series of dampers and shut off the supply of fuel to the corresponding series of ports and to open the other series of dampers and permit delivery of fuel to the corresponding series of ports.

JAMES E. McBURNEY.